United States Patent
Almog

(10) Patent No.: US 8,457,488 B2
(45) Date of Patent: Jun. 4, 2013

(54) TECHNOLOGY FOR PROVIDING TELECOMMUNICATION SERVICES TO MULTIPLE OPTICAL COMMUNICATION LINES

(75) Inventor: Ariel Almog, Kochav Yair (IL)

(73) Assignee: ECI Telecom Ltd., Petach Tikva (IL)

( * ) Notice: Subject to any disclaimer, the term of this patent is extended or adjusted under 35 U.S.C. 154(b) by 354 days.

(21) Appl. No.: 12/866,868

(22) PCT Filed: Jan. 21, 2009

(86) PCT No.: PCT/IL2009/000082
§ 371 (c)(1), (2), (4) Date: Aug. 9, 2010

(87) PCT Pub. No.: WO2009/098677
PCT Pub. Date: Aug. 13, 2009

(65) Prior Publication Data
US 2010/0316390 A1    Dec. 16, 2010

(30) Foreign Application Priority Data
Feb. 7, 2008 (IL) .......................... 189342

(51) Int. Cl.
*G02F 1/00* (2006.01)
(52) U.S. Cl.
USPC ............. 398/5; 398/2; 398/3; 398/4; 398/66; 398/68; 398/72; 398/100; 398/33; 370/218; 370/228; 370/389; 370/392; 370/400
(58) Field of Classification Search
USPC ................... 398/1, 2, 3, 4, 5, 7, 8, 66, 67, 68, 398/70, 71, 72, 98, 99, 100, 17, 20, 22, 23, 398/24, 33, 38, 45, 48; 370/216, 400, 401, 370/389, 392, 351, 352, 228, 254, 248, 238, 370/258, 217
See application file for complete search history.

(56) References Cited

U.S. PATENT DOCUMENTS

| | | | |
|---|---|---|---|
| 6,567,323 B2 | 5/2003 | Pitts et al. | |
| 6,567,576 B2 | 5/2003 | MacDonald | |

(Continued)

FOREIGN PATENT DOCUMENTS

| | | |
|---|---|---|
| EP | 1041852 A2 | 10/2000 |
| EP | 1883267 A2 | 1/2008 |

OTHER PUBLICATIONS

International Telecommunication Union, Series G: Transmission Systems and Media, Digital Systems and Networks; Digital sections and digital line system—Optical line systems for local and access networks, ITU-T G.983.1, 2005.

*Primary Examiner* — Hanh Phan
(74) *Attorney, Agent, or Firm* — Browdy and Neimark, PPLC

(57) ABSTRACT

A system for serving N optical communication lines by a redundant set of modules in an optical network; where the set of modules comprises N>1 main modules and one backup module, N optical splitters, 2N fiber connections and a control means. In the system, each of the N optical splitters is connected to two different modules of the set by two respective fiber connections out of the 2N connections, while each of the N optical splitters is also coupled to one of the N optical communication lines. The arrangement is such that the control means selectively activates/inactivates any of the fiber connections for respectively enabling/blocking transfer of data there-along; the control means thus ensures that each specific line of the N optical communication lines is always served by either one or another of two different modules.

13 Claims, 4 Drawing Sheets

U.S. PATENT DOCUMENTS

| | | | |
|---|---|---|---|
| 6,868,232 B2* | 3/2005 | Eijk et al. ......................... 398/5 |
| 6,975,586 B1 | 12/2005 | Yoshimura |
| 7,801,442 B2* | 9/2010 | Wang et al. ..................... 398/5 |
| 7,865,077 B2* | 1/2011 | Mukojima ....................... 398/1 |
| 2002/0071149 A1* | 6/2002 | Xu et al. ....................... 359/110 |
| 2002/0097465 A1 | 7/2002 | Nobuyasu |
| 2006/0104638 A1* | 5/2006 | Chung et al. .................. 398/71 |
| 2007/0058973 A1* | 3/2007 | Tanaka ........................... 398/1 |
| 2008/0025724 A1 | 1/2008 | Ozaki |

* cited by examiner

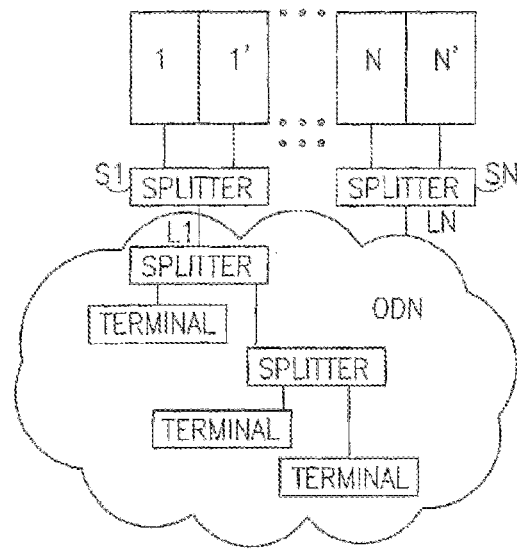
*FIG. 1 – PRIOR ART*
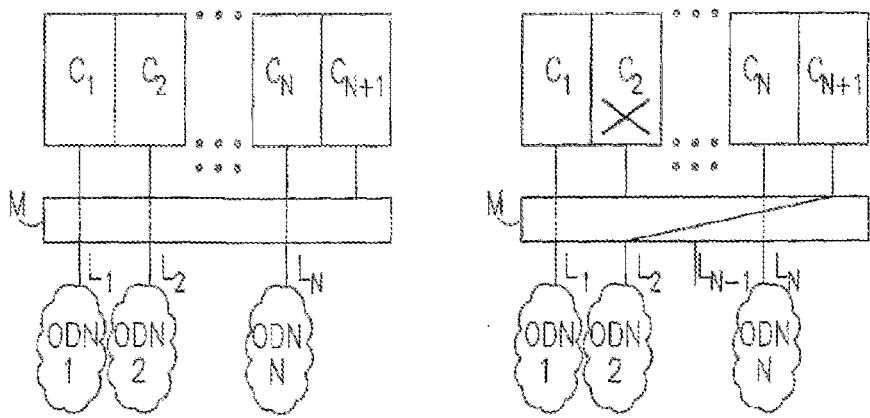
*FIG. 2A – PRIOR ART*     *FIG. 2B – PRIOR ART*

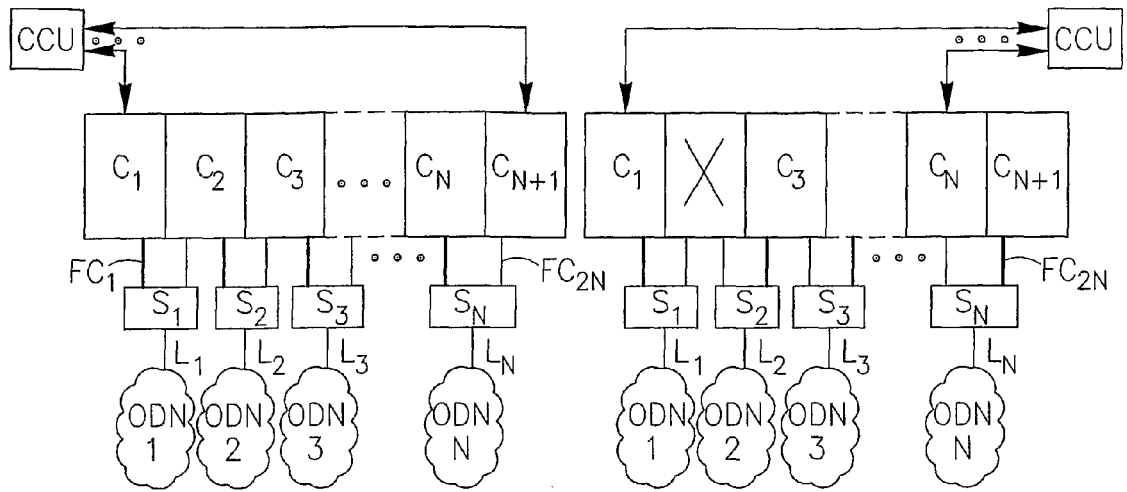
*FIG.3A*          *FIG.3B*
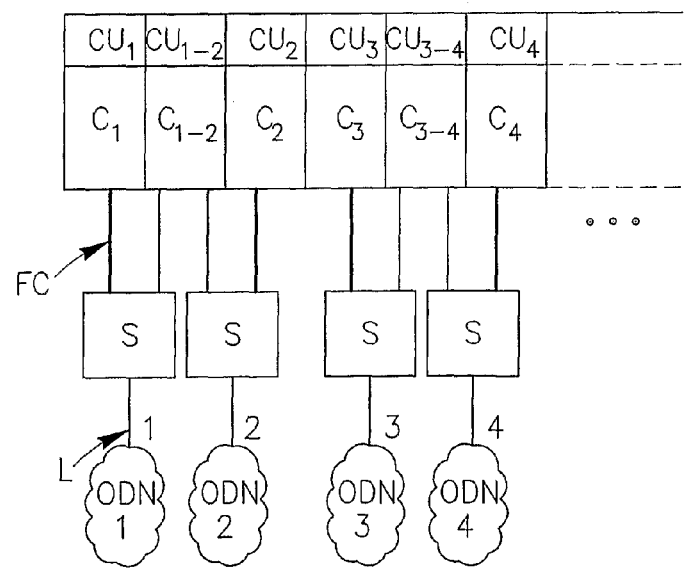
*FIG.4*

TECHNOLOGY FOR PROVIDING TELECOMMUNICATION SERVICES TO MULTIPLE OPTICAL COMMUNICATION LINES

FIELD OF THE INVENTION

The present invention relates to a technique of constructing redundant N+1 configurations for providing telecommunication services to multiple telecommunication lines. The technique is actual for various optical networks, for example for passive optical networks (PON) such as GPON, BPON, EPON, GEPON, and also for ring-like optical networks utilizing SDH/SONET technology.

BACKGROUND OF THE INVENTION

Reliability of equipment is often reached by ensuring redundancy, i.e. by providing to the equipment a backup portion ready for being activated when the main portion of the equipment fails. Optical networks carry a vast amount of traffic and therefore they tend to use redundancy of optical equipment (usually, optical module/card redundancy).

Currently available redundancy solutions for optical networks suffer from the fact that due to their intrinsic fiber structure, both an active and a redundant card (module) is to be connected to the fiber line of interest by some optical equipment. The use of simple optical splitters dictates utilizing the so-called full (1:1) redundancy, which is double-priced by definition. However, when other redundancy schemes are utilized, it requires complex and thus very expensive optical switching matrices.

One commonly known today's solution using the 1+1 redundancy and regular optical Y-type splitters (combiners) is shown in FIG. 1. Each splitter is connected to a telecommunication optical line L that may be further connected to an optical data network (OND). For example, cards 1 and 1' form the 1+1 redundancy configuration connected to a splitter S1 and serving line L1; any other pair of the cards in the example is provided with its own splitter and serves its specific line. The main drawback of this solution is its price, since the full redundancy means just doubling of the number of cards. Therefore, there is an economic motivation to move to N+1 redundancy in order to reduce the optical network cost. An example of another presently available redundancy solution is shown in FIG. 2a. In the illustrated N+1 solution, N main cards marked C1 . . . CN are protected by a single redundant card marked CN+1 with the aid of an optical matrix M. Each of the N main cards by default serves its assigned optical communication line (L1, L2, . . . LN) which may lead, for example, to respective N optical data networks ODN. When one of the N main cards becomes unavailable (see card C2 in FIG. 2b), the optical matrix M switches the backup card CN+1 to the optical network that was connected to the unavailable card: in our example, card#2 (C2) is malfunctioned, and its matching optical communication line L2 is switched to the redundant card CN+1).

This N+1 scheme suffers both from high price of the optical matrix M and from its attenuation, which is much greater than that of a regular splitter.

ITU-T standard Recommendation G.983.1, in its Annex IV, recommends a number of redundancy implementations for optical access networks, and mentions that the recommended implementations are considered economic. However, all the configurations recommended in the standard comprise optical splitters and various combinations thereof which actually form optical matrices.

Another example of a complex optical switch matrix is described in US2002136484A, which relates to a multi-stage non-blocking optical switch matrix having failure protection.

It should be noted that the cost of optical switching matrices is extremely high and cannot be compared, even by order, with costs of complex switching equipment in non-optical systems (Say, an optical matrix of the switching ability 1:16 presently costs 60 times more than an electrical matrix of the same switching ability).

A non-optical switching system is described in US2002118581A that defines a memory having flexible column redundancy and flexible row redundancy comprises a multi-column stick configuration; each column stick comprising a plurality of data lines. Further, the memory has a multi-row stick configuration, with each row stick comprising a plurality of data rows. Positioned on either side of the memory are redundant column sticks each comprising a plurality of data lines. Positioned above and below the memory are redundant row sticks, each comprising a plurality of data rows. A column redundancy control identifies a faulty operating column stick in the memory and generates a column shift control signal to a column shift multiplexer that responds to the column shift control signal to substitute in the memory a redundant column stick for the identified faulty operating column stick. Further, the memory comprises a row redundancy controller that identifies a faulty operating row stick in the memory to generate a row shift control signal to a row shift multiplexer. The row shift multiplexer responds to the row shift control signal to substitute in the memory a redundant row stick for the identified faulty operating row stick in the memory. However, such or similar operations are impossible to perform in optical networks at the price of non-optical switching systems.

OBJECT AND SUMMARY OF THE INVENTION

It is the object of the present invention to propose a simple and cost effective solution of arranging an N+1 redundancy equipment set in optical networks, for serving N communication optical lines.

The N+1 redundancy set of equipment comprises N>1 main functional modules and a single backup functional module. In the description, the term "functional module" will be used intermittently with the term "optical module" and the term "module", and will indicate a module comprising electronic and optical functional blocks and control means for providing communication service to optical networks.

The above object can be achieved by
providing N regular optical splitters to an N+1 redundancy set of equipment in an optical communication network,
providing 2N fiber connections and connecting each of the N optical splitters, at one side, to two different optical modules of the set via two fiber connections out of said 2N;
ensuring that in such an arrangement at least one optical module of the N+1 redundancy set is connected to two fiber connections (out of said 2N fiber connections), that said two fiber connections are respectively coupled to two different splitters of said N optical splitters and that said at least one optical module is operative to selectively convey data via either one or another of said two fiber connections;
connecting each of the N optical splitters at its other side to an optical communication line, thereby interconnecting the N+1 redundancy set with N communication lines;
controlling the N+1 redundancy set by selectively activating and inactivating said 2N fiber connections to ensure that each specific line of the N optical communication lines will always be served by either of two different optical modules connected to the optical splitter coupled to said specific optical communication line.

To be connected to the two different optical fiber connections, said at least one of the optical modules of the set must comprise at least two interfaces. (More interfaces can be provided in the optical module to form redundancy for the two basic interfaces and/or to support various protocols).

In the frame of the present patent application, the interface should be understood as a controllable assembly, preferably comprising at least an E/O and O/E converter and a transceiver for transforming electrical signals of the functional (mainly electronic) circuitry of the module into optical signals transferrable via an optical fiber, and vise versa. The optical signals to be conveyed via an optical fiber to a specified network can be transferred with a protocol suitable for that specified optical network, and the interface may be responsible for supporting the required protocol. Preferably, each of said optical modules are manufactured with at least a pair of interfaces to be ready for interconnecting with the two different fiber connections.

The control of the N+1 redundancy set preferably comprises ensuring that each of the optical modules always has no more than one activated interface (i.e., fiber connection) at a time, as well as ensuring that each of the splitters is always connected to only one activated fiber connection at a time.

In practice, the control can be then performed by activating (enabling) and deactivating (blocking) interfaces of the optical modules so that only one interface can be currently active at each optical module. By default, the activated interfaces (fiber connections) should be those which allow the N optical communication lines to be served by the N main optical modules. A reason for blocking of a previously activated interface of an optical module can be one of the following:
  a fault occurs in a specific optical module as a whole, in its presently active interface or in the respective fiber connection, or
  the presently inactive, interface of the same optical module must be activated.

In practice, the optical module can be manufactured as a separate card, or be a portion of a card; the optical module is provided with its functional circuitry for providing communication services, and at least two controllable interfaces connected to the functional circuitry. One card may accommodate two or more such optical modules each having at least two interfaces. Such an aggregated card, in the proposed N:1 redundant configurations, may survive a number of faults (say, of a specific interface or of the functional core of any specific module) and still remain able to provide service to the communication lines of interest up to the moment when the card is finally replaced. Redundant configurations of the described modules/cards are preferably situated at the head end of an optical network. The head end of an optical network usually means equipment providing communication service to the network, and a control device for controlling the network served by that equipment. However, the proposed redundant configurations may be placed at terminal points, for example in ring-like optical networks.

A number of possible configurations of the proposed controllable N+1 redundancy set of optical equipment will be described below in the non-limiting exemplary embodiments presented below.

In addition to the inventive redundant configurations themselves and a method for arranging the described configurations, the invention also provides a module/card suitable for building such configurations.

The invention provides a module for providing communication service, together with two or more similar modules forming N+1 redundancy configuration, to a group of optical communication lines; the Module comprises a functional electronic block interconnected with at least two interacts for serving two different optical communication lines out of said group, said module is provided with control means which:
  comprise monitoring means for monitoring status of said functional block and said interfaces,
  are adapted to receive information characterizing status of at least one of said similar modules, and
  are capable, based on said monitoring and said information, of selectively activating/inactivating said at least two interfaces to ensure that only one of them is active at a time.

A card intended for building the N+1 redundant configurations may comprise at least one above-described module, the control means of said at least one module will form part of a control unit of the card, wherein the control unit of the card should be adapted to maintain control communication with an external control entity being either a central control entity or a control unit of at least one similar card.

BRIEF DESCRIPTION OF THE PREFERRED EMBODIMENTS

The invention will be further described with reference to the following non-limiting examples, in which:

FIG. 1 (prior art) illustrates an example of a conventional 1+1 redundancy arrangement for optical networks.

FIGS. 2a, 2b (prior art) show an example of a conventional N+1 redundancy arrangement for optical networks.

FIG. 3a illustrates a general concept of the proposed N+1 redundancy set of optical equipment, during the normal operation.

FIG. 3b illustrates how the set shown in FIG. 3b is modified when a fault occurs in one of the optical modules.

FIG. 4 schematically illustrates an example of a so-called compact 2+1 redundancy.

Figure 5:
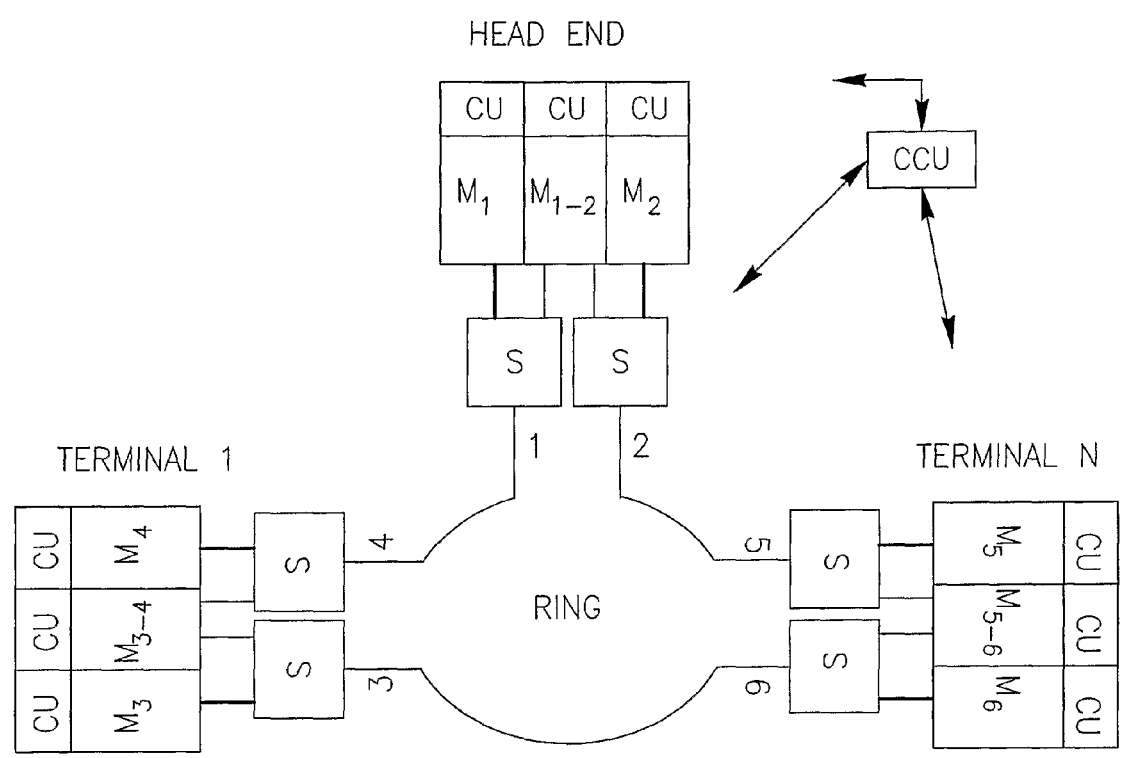

FIG. 5 illustrates how the compact 2+1 redundancy of FIG. 4 can be implemented in an optical ring network.

Figure 6:
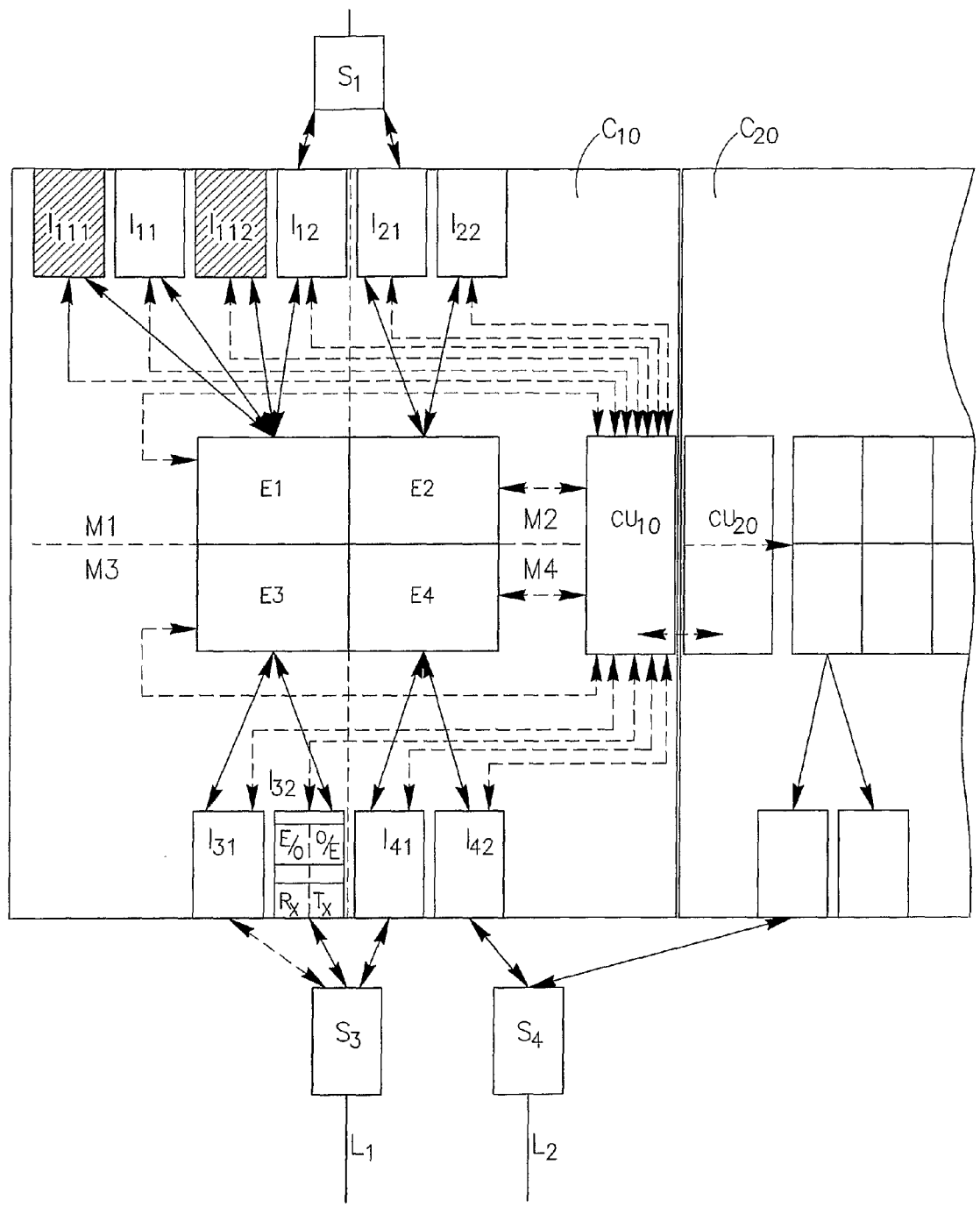

FIG. 6 illustrates an example of an aggregated card comprising a number of optical modules according to the invention.

DETAILED DESCRIPTION OF THE INVENTION

The compact and inexpensive N+1 redundancy concept, proposed in the present patent application, is based on a functional module with at least two interfaces, where only one of them is active at a specific time, and on the use of inexpensive optical splitters (combiners), such as Y-type splitters.

As shown in FIG. 3a, the proposed general redundancy configuration comprises N main functional modules in the form of separate cards C1 . . . CN and one backup module (card) CN+1. In the description, the term "functional module" is used intermittently with the term "optical module" and just "module". The cards are accompanied by N optical splitters S1 . . . SN, each connected at its combiner port to a communication line L1 . . . LN which respectively lead to optical access networks ODN1 . . . ODNN, for example GPON networks. In the illustrated embodiment, the cards are arranged in a row though it is not mandatory; the row configuration is shown for the purpose of illustration only.

Each card (except for the two outer cards in the row) is connected to two fiber connections FC via respective interfaces provided in the cards. The whole configuration comprises 2N such fiber connections. The fiber connections FC, by pairs, are connected to the optical splitters S so that each splitter, via its splitter ports, is interconnected with two different cards. Owing to that arrangement, each of the communication lines, via its associated splitter, can be served either by one or by another of the two cards interconnected with the splitter.

According to the proposed concept, only one interface of each module (card) is active, so the data from each card is transmitted only to one fiber connection FCi, arrives to a suitable optical splitter Si and is fed to the optical communication line Li connected to the splitter. In the normal state of operation, all the communication lines L1 . . . LN are respectively served by the main cards C1 . . . CN. In the illustrated example, the interfaces active in the normal state of operation are indicated by marking their respectively active fiber connections as thick solid lines. A central control unit CCU is schematically shown as an external block being in bidirectional control communication with all the cards C1 to CN+1.

FIG. 3b demonstrates the optical network performing a redundancy operation in the set shown in FIG. 3a, caused by a malfunction of card C2.

When working in the normal regime, card C1 supported an access optical network ODN1, card C2 supported optical network ODN2, etc. When card C2 becomes unavailable, both its interfaces (and associated fiber connections) become inactive; due to that, card C3 is taking over and starts supporting optical network ODN2 via its left-hand fiber connection which now becomes active. However, since the right-hand fiber connection of card C3 must be inactivated, card 4 is taking over by activating its left-hand interface and fiber connection and thus begins supporting optical network ODN3. The process goes on, so that every card on the right of the unavailable card takes over the communication line previously supported by the left-hand adjacent card and thus the backup card CN+1 is finally utilized.

It should be noted that in the illustrated example, where each card comprises only one module and each module comprises only two interfaces, malfunction of a card can be detected if its module fails, and malfunction of at least one of the module's interfaces or a fault in at least one of the associated fiber connections are actually equal to failure of the module, at least in providing service via a specific fiber connection. The main drawback of the illustrated arrangement is that the 'switching operation' is not applied only to the unavailable card, but to all the cards located between that card and the redundant card.

A solution can be to place the redundant card in the middle of the row (being it a real or a virtual row). Using thus modified scheme will statistically give a minimum number of affected cards in the case of switchover.

FIG. 4 illustrates one specific case of the compact N+1 redundancy solution, namely a compact 2+1 redundancy arrangement. This solution does not suffer from affecting/the outage of "innocent" networks as described above in FIG. 3b. It offers the same extent of reliability as the 1+1 redundancy scheme but costs less.

Control in that embodiment is performed by means of local embedded control units CU1 . . . CU4 . . . respectively provided in each of the optical modules (C1, C2, C1-2, C3, C4, C3-4 . . . ), and being in control communication with one another.

The above-described N+1 redundancy schemes can be used in ring topology networks, for example in the way as shown in FIG. 5.

Any of the above-mentioned redundancy configurations are controlled by a control unit/system, and such control units are schematically shown in the drawings by way of non-limiting examples. The control unit comprises hardware/software control means, which may include an external block, or one or more local blocks embedded in the cards (for example forming a master/slave control scheme where each of the modules is ready to take responsibility if it detects that the adjacent module/the assigned pair module fails). Alternatively, the control unit may be mixed and may thus comprise both an external (central) portion and an embedded (local) portion distributed between the modules (for example, as shown in FIG. 5).

FIG. 6 is a schematic block-diagram of an aggregated card C10, which accommodates more than one optical module (in this example, four modules: M1, M2, M3 and M4). Such a card is closer to practical needs than those illustrated in the preceding embodiments. Each of the modules M1, M2, M3 and M4 comprises its functional electronic circuitry being the most complex and expensive component of the module (E1, E2, E3, E4). Preferably, the modules M1 . . . M4 are interconnected with an outer network domain (the outer network and the manner of its connection with M1 . . . M4 are not shown) in order to provide service to communication lines L1, L2 and the like. Lines L are preferably connected to optical networks, usually access networks (not shown in this drawing). The electronic circuitry of each module is connected to at least two interfaces: say, in the module M3, the block E3 is provided with two interfaces—I31 and I32. Interface I32 is shown in more details, and it comprises a block of O/E and E/O converter and a transceiver (laser) block Tx/Rx. In the illustrated card, the interface I32 may serve a backup interface to the interface I32, if required (shown by a: dashed line between the interface I31 and a splitter S3 which may have three inputs).

To demonstrate a possible embodiment of the module(s) and of the card, one exemplary module M1 is shown as comprising four interfaces, for example interfaces I11 and I12 of a first type support one network protocol, and interfaces I111 and I112 of a second type support another network protocol. If the second type interfaces are required for serving optical networks according to the proposed N+1 redundancy scheme, at least one additional module in the scheme must also comprise at least one similar interface, so that at least one communication line could be served either by M1 or by that additional module via a splitter. Selection of a required interface of the required type can be performed by a control unit (CU10).

A fault of a module—say, of module M3—may be detected when either its functional circuitry E3 or at least one of its interfaces I31 or I32 fails, but the fault of the module does not yet mean that the whole card C10 becomes faulty, since the redundancy scheme allows utilizing other modules in the card to maintain the suitable communication line (L1) in the operative condition (in our example, the module M4 will be readily utilized, but if M1 or M2 is spare, it may be taken into account in a case of emergency and new connections can be established).

The aggregated card C10 therefore not only allows using each expensive optical module more efficiently by providing for it at least two relatively cheap interfaces, but also allows to statistically prolong the lifetime of the card before it will have to be replaced.

The card C10 is provided with control unit CU10 which receives signals from a kind of monitoring equipment such as sensors (not shown) located at the blocks E1-E4 and at all interfaces of the four modules M1-M4. Based on the information received from the sensors and, in general, also from an external control unit (in this case, the control unit CU20 of the adjacent card C20), the control unit CU10 determines which blocks of the card C10 are in order and which are not, which interfaces are to be enabled and which should be blocked, and provides suitable control signals.

It should be appreciated that the examples presented in the patent application must not limit the scope of the invention, that other possible embodiments of the module, the card, the redundant N+1 configuration, as well as other versions of the method could be proposed and are to be considered part of the invention whenever belong to the scope of the claims which follow.

The invention claimed is:

1. A system for serving multiple optical communication lines by a redundant set of modules in an optical network, the system comprising:
    N optical communication lines;
    said set of modules comprising N (N>1) main modules and one backup module,
    N optical splitters, each comprising at least a first and a second ports at one end of the splitter and a third port at the opposite end of the splitter,
    2N fiber connections;
    control means;
    wherein
    each of the N optical splitters, via its third port, is coupled to one of said N optical communication lines;
    each of said N optical splitters, via its first and second ports, is connected to two different modules of said set by two respective fiber connections out of said 2N connections;
    at least one module of the set is connected to two fiber connections out of said 2N fiber connections, being respectively coupled to two different splitters out of said N optical splitters, and that said at least one module is operative to selectively transfer data via either one or another of said two fiber connections;
    the control means being capable of selectively activating/inactivating any of said fiber connections for respectively enabling/blocking transfer of data there-along so as to ensure that each specific line of the N optical communication lines is always served by either one or another of two different modules connected to the optical splitter coupled to said specific optical communication line, while avoiding use of an optical switch for diverting a stream of data which has partially been conveyed via one of the two different modules, to the other of the two different modules.

2. The system according to claim 1, wherein the control means being further adapted to ensure that each of the modules always has no more than one activated fiber connection at a time, and that each of the splitters is always connected to only one activated fiber connection at a time.

3. The system according to claim 1, wherein said fiber connections are connected to said modules of the set via respective interfaces provided in the modules, said at least one module of the set comprises two of said interfaces adapted to selectively transfer data via either one or another of said two fiber connections, and wherein the activating/inactivating of said 2N fiber connections is performed by respectively activating/inactivating interfaces of said modules of the set.

4. The system according to claim 1, wherein said control means is adapted to ensure that
    each of the N communication lines is by default served by one of said N main modules;
    while, if at least one of the following events takes place:
    a fault in a specific module of said N main modules,
    a fault or inactivation of a fiber connection currently active between the specific module and an optical splitter associated with said fiber connection,
    the control means is adapted to activate the remaining fiber connection of said optical splitter, thus the communication line, previously served by said specific module, starts being served by another module of said set via the activated fiber connection of said splitter.

5. The system according to claim 1, wherein N=2, the two main modules are respectively interconnected with the two splitters, each via one fiber connection, wherein said backup module is interconnected by two fiber connections to said two respective splitters.

6. The system according to claim 1, wherein said modules of the set are arranged in a row so that each two adjacent modules in the row are connected to a common splitter, via two respective fiber connections.

7. The system according to claim 1, wherein N.gtoreq.2 and wherein said control means ensure that, when said another module of the set starts serving said communication line via the activated fiber connection, the remaining fiber connection of said another module becomes inactivated.

8. A module for providing communication service, together with two or more similar modules forming N+1 redundancy configuration, to a group of optical communication lines; the module comprises a functional electronic block interconnected with at least two interfaces for serving two different optical communication lines out of said group, and is provided with control means which:
    comprise monitoring means for monitoring status of said functional block and said interfaces,
    are adapted to receive information characterizing status of at least one of said similar modules, and
    are capable, based on said monitoring and said information, of selectively activating/inactivating said at least two interfaces to ensure that only one of them is active at a time.

9. A card comprising at least one module according to claim 8, wherein the control means of said at least one module forms part of a control unit of the card, and wherein the control unit of the card is adapted to maintain control communication with an external control entity being either a central control entity or a control unit of at least one similar card.

10. A method for serving N optical communication lines by a set of equipment with N+1 redundancy in an optical communication network, comprising the following steps:
    arranging said set of equipment comprising N>1 main modules and a single backup module,
    providing N optical splitters, each having a first and a second ports at one end of the splitter and a third port at the other end of the splitter;
    providing 2N fiber connections and connecting each of the N optical splitters to two different modules of the set via two fiber connections out of said 2N fiber connections, using the first port and the second port of the splitter;
    ensuring that in such an arrangement at least one module of the set is connected to two fiber connections out of said 2N fiber connections, being respectively coupled to two different splitters out of said N optical splitters, and that said at least one module is operative to selectively transfer data via either one or another of said two fiber connections;
    connecting each of the N optical splitters at its third port to an optical communication line, thereby interconnecting said set of equipment with N communication lines;

controlling said set by selectively activating/inactivating said 2N fiber connections to ensure that each specific line of the N optical communication lines will always be served by either of two different modules connected to the optical splitter coupled to said specific optical communication line, while avoiding use of an optical switch for diverting a stream of data which has partially been conveyed via one of the two different modules, to the other of the two different modules.

11. The method according to claim 10, wherein said fiber connections are connected to said modules via respective interfaces provided in the modules, said one or more of the modules of the set comprises at least two interfaces in the module, adapted to selectively transfer data via either one or another of said two fiber connections, and wherein the activating and inactivating of said 2N fiber connections is performed by respectively activating and inactivating the interfaces of said modules.

12. The method according to claim 10, wherein the step of controlling comprises ensuring that each of the modules always has no more than one activated fiber connection at a time, as well as ensuring that each of the splitters is always connected to only one activated fiber connection at a time.

13. The method according to claim 10, wherein the step of controlling comprises:
    activating, by default, those fiber connections out of said 2N, which allow the N optical communication lines to be served by the N main modules, and
    inactivating a previously activated fiber connection of a specific module out of said N main modules when at least one of the following reasons takes place:
        a fault occurs in any portion of interconnection between the specific module and its presently active fiber connection,
        the presently inactive fiber connection of said specific module must be activated.

* * * * *